United States Patent
Dehlink et al.

(10) Patent No.: US 12,252,068 B2
(45) Date of Patent: Mar. 18, 2025

(54) SENSING AN OBJECT IN THE SURROUNDINGS OF A MOTOR VEHICLE

(71) Applicant: Bayerische Motoren Werke Aktiengesellschaft, Munich (DE)

(72) Inventors: Bernhard Dehlink, Munich (DE); Mehdi Farid, Munich (DE); Gunter Hannig, Fuerstenfeldbruck (DE); Nico Kaempchen, Marzling (DE); Christian Unger, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 423 days.

(21) Appl. No.: 17/292,638

(22) PCT Filed: Oct. 25, 2019

(86) PCT No.: PCT/EP2019/079162
§ 371 (c)(1),
(2) Date: May 10, 2021

(87) PCT Pub. No.: WO2020/099101
PCT Pub. Date: May 22, 2020

(65) Prior Publication Data
US 2022/0009405 A1    Jan. 13, 2022

(30) Foreign Application Priority Data
Nov. 13, 2018 (DE) .................. 10 2018 128 350.4

(51) Int. Cl.
*B60Q 1/14* (2006.01)
*G06F 18/24* (2023.01)
(Continued)

(52) U.S. Cl.
CPC .......... *B60Q 1/1423* (2013.01); *G06F 18/24* (2023.01); *G06V 20/58* (2022.01); *H05B 47/125* (2020.01);
(Continued)

(58) Field of Classification Search
CPC .............. B60Q 1/1423; B60Q 2300/41; B60Q 2300/45; H05B 47/125; G06B 20/58; G06K 9/6267
See application file for complete search history.

(56) References Cited

U.S. PATENT DOCUMENTS

| | | | |
|---|---|---|---|
| 9,517,717 B2 | 12/2016 | Komatsu et al. | |
| 2008/0225271 A1* | 9/2008 | Ohmura | B60Q 1/085 356/51 |

(Continued)

FOREIGN PATENT DOCUMENTS

| | | |
|---|---|---|
| CN | 102317952 A | 1/2012 |
| DE | 10 2011 081 432 A1 | 2/2013 |

(Continued)

OTHER PUBLICATIONS

International Search Report (PCT/ISA/210) issued in PCT Application No. PCT/EP2019/079162 dated Jan. 30, 2020 with English translation (six (6) pages).

(Continued)

*Primary Examiner* — Wei (Victor) Y Chan
(74) *Attorney, Agent, or Firm* — Crowell & Moring LLP

(57) ABSTRACT

A system for sensing at least one object in the surroundings of a motor vehicle, includes at least one first sensor for classifying the at least one object, the ability of the at least one first sensor to carry out classification depending on the brightness of the at least one object; at least one second sensor for detecting the at least one object; and at least one actuator for increasing the brightness of the at least one (Continued)

object. The system is designed to increase the brightness of the at least one object by the at least one actuator when the at least one second sensor detects the at least one object and the at least one first sensor cannot classify the at least one object.

15 Claims, 2 Drawing Sheets

(51) Int. Cl.
  *G06V 20/58* (2022.01)
  *H05B 47/125* (2020.01)
(52) U.S. Cl.
  CPC ...... *B60Q 2300/41* (2013.01); *B60Q 2300/45* (2013.01)

(56) References Cited

U.S. PATENT DOCUMENTS

| | | | |
|---|---|---|---|
| 2009/0279317 A1* | 11/2009 | Tatara | B60Q 1/143 362/465 |
| 2012/0062372 A1 | 3/2012 | Augst | |
| 2012/0146506 A1 | 6/2012 | Nakano et al. | |
| 2012/0226412 A1* | 9/2012 | Nakadate | B60Q 1/143 701/36 |
| 2014/0333201 A1 | 11/2014 | Foltin | |
| 2015/0137680 A1 | 5/2015 | Komatsu et al. | |
| 2017/0057402 A1* | 3/2017 | Uesugi | B60Q 1/1423 |
| 2018/0253609 A1* | 9/2018 | Potter | B60Q 1/08 |
| 2020/0001777 A1 | 1/2020 | Hiroi | |
| 2021/0129740 A1* | 5/2021 | Kato | B60Q 1/085 |

FOREIGN PATENT DOCUMENTS

| | | |
|---|---|---|
| DE | 10 2015 016 333 A1 | 6/2017 |
| EP | 3 281 824 A1 | 2/2018 |
| JP | 2002-163784 A | 6/2002 |
| JP | 2009-83824 A | 4/2009 |
| JP | 2010-18080 A | 1/2010 |
| JP | 2012-121521 A | 6/2012 |
| JP | 2018-103904 A | 7/2018 |
| WO | WO 2018/167879 A1 | 9/2018 |

OTHER PUBLICATIONS

German-language Written Opinion (PCT/ISA/237) issued in PCT Application No. PCT/EP2019/079162 dated Jan. 30, 2020 (seven (7) pages).
German-language Search Report issued in German Application No. 10 2018 128 350.4 dated Oct. 10, 2019 with partial English translation (12 pages).
Japanese-language Office Action issued in Japanese Application No. 2021-521525 dated Apr. 26, 2023 with English translation (7 pages).
Partial Chinese-language Office Action issued in Chinese Application No. 201980073972.4 dated Sep. 27, 2024 with partial English translation (10 pages).

* cited by examiner

SENSING AN OBJECT IN THE SURROUNDINGS OF A MOTOR VEHICLE

BACKGROUND AND SUMMARY OF THE INVENTION

The invention relates to a system and a method for sensing an object in the surroundings of a motor vehicle.

It is known that sensing an object in the surroundings of a motor vehicle comprises various partial tasks. In this case, a first partial task constitutes simply recognizing the presence of the object. A second partial task furthermore constitutes classifying the object, that is to say the classification of the object in one of a plurality of object classes determined beforehand.

Furthermore, it is known that some sensors, although very well suited to recognizing objects, are less suited to classifying objects. On the other hand, it is known that some other sensors are less suited to recognizing objects, but in return are very well suited to classifying objects.

Therefore, the problem addressed by the invention is that of specifying a system and a method which improve the class allocation of objects in the surroundings of the motor vehicle.

The problem is solved by the features of the independent patent claims. Advantageous embodiments are described in the dependent claims. It is pointed out that additional features of a patent claim dependent on an independent patent claim, without the features of the independent patent claim or merely in combination with a subset of the features of the independent patent claim, can form a separate invention which is independent of the combination of all features of the independent patent claim and which may be made the subject of an independent claim, a divisional application or a subsequent application. This applies in the same way to technical teachings described in the description, which can form an invention independent of the features of the independent patent claims.

A first aspect of the invention relates to a system for sensing at least one object in the surroundings of a motor vehicle.

The object can be in particular a road user, for example a motor vehicle, a cyclist or a pedestrian. However, it can also not be a road user. In particular, it can be an infrastructure object such as, for example, a traffic sign or a bridge over a roadway.

The system comprises at least one first sensor for class allocation of the at least one object, wherein a classification capability of the at least one first sensor depends on the brightness of the at least one object.

A classification is a planned collection of abstract classes (also concepts, types or categories) which are used for delimitation and ordering. The individual classes are generally obtained by the classifications of objects on the basis of specific corresponding features. Numerous classifications are structured hierarchically in levels with differing differentiation. The set of class names forms a controlled vocabulary. The application of a classification to an object by selection of an appropriate class of the given classification is called classifying or class allocation.

In this case, the classification capability of the at least one sensor describes the capability and/or prospect of success with regard to a class allocation for the at least one object being able to be effected by the at least one sensor.

The brightness of the at least one object is, in particular, the sum of the light generated by the at least one object itself and the light reflected from the at least one object.

By way of example, the brightness can be a purely physical measurement variable indicating the spectrally averaged radiation emanating from the at least one object with the candela unit of measurement.

Alternatively, the brightness can be for example a luminous flux describing the radiation emitted by the at least one object in the form of visible light with the lumen unit of measurement.

Alternatively, the brightness can be for example an illuminance with the lux or luminous flux density unit of measurement describing the area-related luminous flux that impinges on an illuminated object.

Furthermore, the system comprises at least one second sensor for recognizing the at least one object.

In this case, recognizing the at least one object is limited for example to recognizing the presence of the object without a class allocation of the object.

Moreover, the system comprises at least one actuator for increasing the brightness of the at least one object.

The system is configured to increase the brightness of the at least one object by the at least one actuator if the at least one second sensor recognizes the at least one object and the at least one first sensor cannot classify the at least one object.

The invention here is based on the concept that by increasing the brightness of the at least one object, the latter can be classified by the at least one first sensor since the classification capability, as already described, depends on the brightness of the at least one object.

Therefore, the system is configured, in particular, after increasing the brightness of the at least one object by the at least one actuator, to allocate a class to the object by the at least one first sensor.

Furthermore, the system comprises a control unit, in particular. In this case, the control unit is configured to receive sensor signals from the at least one first sensor and the at least one second sensor and to control the actuator. The control unit is configured to control the actuator in such a way that the brightness of the at least one object is increased if the sensor signals of the at least one second sensor are characteristic of the fact that the at least one second sensor recognizes the at least one object, and if the sensor signals of the at least one first sensor are characteristic of the fact that the at least one first sensor cannot classify the at least one object.

In one advantageous embodiment, the system is configured to reduce the brightness of the at least one object after the brightness of the at least one object has been increased.

In particular, the system is configured to reduce the brightness of the at least one object after the object has been allocated to a class by the at least one first sensor.

Alternatively, the system is configured, in particular, to reduce the brightness of the at least one object after a time duration defined beforehand, for example after 0.5 s or 1 s. In this case, the defined time duration can result for example from the functioning of the at least one first sensor. If the at least one first sensor is a camera, for example, then the number of images generated by the camera within the defined time duration can be derived from the image refresh rate of the camera. The time duration can thus be chosen in such a way that the camera generates enough images for the class allocation of the at least one object.

In a further advantageous embodiment, the at least one first sensor is a camera.

In this case, the invention is based on the insight that the camera is very well suited to class allocation of the at least one object since for example edges, colors and/or textures of the at least one object are recognizable by the camera.

However, the classification capability of the camera is greatly dependent on the brightness of the at least one object.

In a further advantageous embodiment, the at least one second sensor is a radar sensor and/or a lidar sensor.

In this case, the invention is based on the insight that both the radar sensor and the lidar sensor are very well suited to recognizing the at least one object since both sensors are only scarcely dependent or not dependent on the brightness of the at least one object. However, edges, colors and/or textures of the at least one object cannot be recognized or can be only scarcely recognized by the lidar sensor and the radar sensor. Therefore, a class allocation of the at least one object is not possible or is only scarcely possible by the lidar sensor or the radar sensor.

In a further advantageous embodiment, the at least one second sensor is not suitable for class allocation of the at least one object. By way of example, the sensor data of the at least one second sensor comprise a point cloud which describes the at least one object and which neither allows the form of the at least one object to be reliably determined nor allows the at least one object to be reliably delimited from other objects.

In a further advantageous embodiment, the at least one actuator is a high beam of the motor vehicle, and the system is configured to activate the high beam for increasing the brightness of the at least one object.

Since the use of the high beam may be subject to legal restrictions, the system is configured, in particular, to reduce the brightness of the at least one object by deactivating the high beam after the brightness of the at least one object has been increased.

In a further advantageous embodiment, the at least one actuator is configured to emit a directional light beam, and the system is configured to align the light beam with the at least one object by the at least one actuator for increasing the brightness of the at least one object.

In this case, the invention is based on the insight that as a result of the targeted illumination of the at least one object, third-party road users are prevented from being dazzled and a class allocation of the at least one object can nevertheless be effected.

In a further advantageous embodiment, the system is configured to increase the brightness of the at least one object by the at least one actuator additionally depending on a spatial position of the at least one object.

In particular, the system is configured to determine the point in time for increasing the brightness of the at least one object depending on at least one of the following criteria:

The at least one object is situated
  next to the roadway,
  at the edge of the roadway,
  on the roadway,
  in the same lane as the motor vehicle,
  in a different lane than the motor vehicle,
  far away from the motor vehicle, or
  in the vicinity of the motor vehicle.

In particular, the system is configured to not immediately increase the brightness of the at least one object if the at least one second sensor recognizes the at least one object, but rather only later depending on the spatial position.

Additionally or alternatively, the system is configured, in particular, to determine the point in time of increasing the brightness of the at least one object depending on a speed of the at least one object, for example a differential speed of the at least one object relative to the speed of the motor vehicle. By way of example, the system is configured to not immediately increase the brightness of the at least one object in the case of a low differential speed, lying below a threshold value, for example, if the at least one second sensor recognizes the at least one object, but rather only with a time delay.

In this case, the invention is based on the insight that the class allocation of the at least one object usually serves to avoid a collision between the motor vehicle and the at least one object. In this case, the spatial position of the at least one object or the speed of the at least one object has a great influence on the probability of collision between the motor vehicle and the at least one object. In the case of a low probability of collision, which can be derived for example from a low differential speed or a large distance between the motor vehicle and the at least one object, it is sufficient to increase the brightness of the at least one object only later. As a result, third-party road users are disturbed to a lesser extent.

In a further advantageous embodiment, the system is configured to increase the brightness of the at least one object by the at least one actuator additionally depending on a spatial position of the motor vehicle.

In this case, the spatial position of the motor vehicle describes, in particular, whether the motor vehicle is situated in a town/city, outside a town/city, on an interstate, on a country road or in a woodland area. In this case, the spatial position of the motor vehicle can be determined in particular by a locating or positioning system of the motor vehicle, e.g. by GPS or Galileo.

In this case, the invention is based on the insight that the spatial position of the motor vehicle may be characteristic of the disturbance of third-party road users by the increase in the brightness of the at least one object. Moreover, the spatial position of the motor vehicle may be characteristic of a probability of collision with the at least one object. By way of example, it can be assumed that road users in a town/city move at a lower speed than those outside a town/city, for which reason for example the point in time of increasing the brightness of the at least one object can be delayed in a town/city.

A second aspect of the invention relates to a method for sensing at least one object in the surroundings of a motor vehicle. In this case, the motor vehicle comprises at least one first sensor for class allocation of the at least one object, and wherein the classification capability of the at least one first sensor (S1) depends on the brightness of the at least one object (O1, O2, O3). Moreover, the motor vehicle comprises at least one second sensor for recognizing the at least one object, and at least one actuator for increasing the brightness of the at least one object.

One step of the method is increasing the brightness of the at least one object by the at least one actuator if the at least one second sensor recognizes the at least one object and the at least one first sensor cannot classify the at least one object.

The above explanations concerning the system according to the invention in accordance with the first aspect of the invention are also applicable, mutatis mutandis, to the method according to the invention in accordance with the second aspect of the invention. Advantageous exemplary embodiments of the method according to the invention that are not explicitly described at this juncture and in the patent claims correspond to the advantageous exemplary embodiments of the system according to the invention that are described above or are described in the patent claims.

The invention is described below on the basis of an exemplary embodiment with the aid of the accompanying drawings.

DETAILED DESCRIPTION OF THE DRAWINGS

Figure 1:
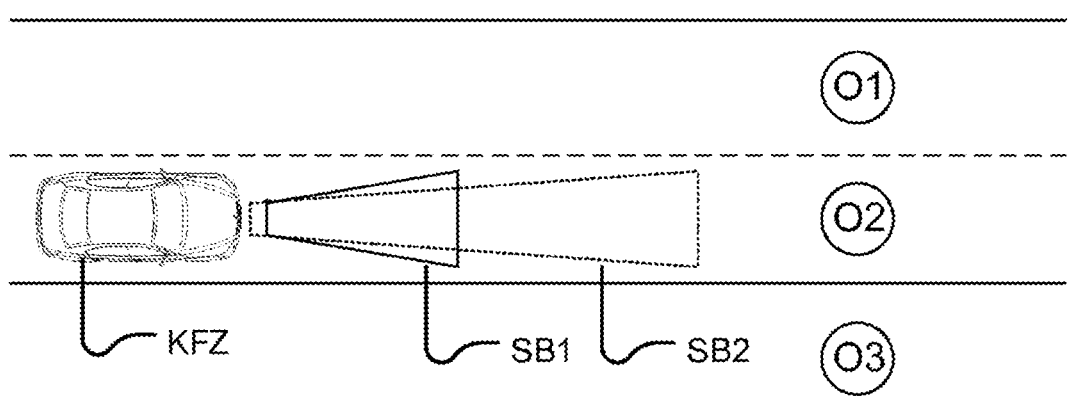
FIG. 1 shows one exemplary embodiment of the system according to the invention.

FIG. 1 shows one exemplary embodiment of the system according to the invention for sensing at least one object O1, O2, O3 in the surroundings of a motor vehicle KFZ.

In this case, the at least one object O1, O2 can be situated on the roadway, for example. Alternatively, the at least one object O3 can also be situated next to the roadway. If the at least one object O2 is situated on the roadway, then it can be situated for example in the same lane as the motor vehicle KFZ. Alternatively, the at least one object O1, if it is situated on the roadway, can also be situated in a different lane than the motor vehicle KFZ.

The system comprises at least one first sensor S1 for class allocation of the at least one object O1, O2, O3. In this case, a classification capability of the at least one first sensor S1 depends on the brightness of the at least one object O1, O2, O3. The sensor range SB1 of the at least one first sensor S1, that is to say the range in which the at least one first sensor S1 can sense objects, is situated for example in the longitudinal direction in front of the motor vehicle KFZ.

The at least one first sensor S1 is a camera, for example.

Furthermore, the system comprises at least one second sensor S2 for recognizing the at least one object O1, O2, O3. The sensor range SB2 of the at least one second sensor S2, that is to say the range in which the at least one second sensor S2 can sense objects, is for example likewise situated in the longitudinal direction in front of the motor vehicle KFZ.

The at least one second sensor S2 is a radar sensor, for example. A radar sensor as the at least one second sensor S2 is not suitable for class allocation of the at least one object O1, O2, O3 since the sensor data of a radar sensor are usually a point cloud of the radar echoes reflected from all objects in the surroundings of the motor vehicle. Therefore, an allocation as to which radar echoes belong to the at least one object O1, O2, O3 is usually not possible or scarcely possible. In particular, no colors or textures of the at least one object O1, O2, O3 can be recognized by means of the point cloud.

Furthermore, the system comprises at least one actuator A, for increasing the brightness of the at least one object O1, O2, O3.

The at least one actuator A is for example a high beam of the motor vehicle KFZ and the system is configured to activate the high beam A for increasing the brightness of the at least one object O1, O2, O3.

Alternatively or additionally, the at least one actuator A, that is to say for example the high beam of the motor vehicle, is configured to emit a directional light beam. In this case, the system is configured to align the light beam with the at least one object O1, O2, O3 by the at least one actuator A for increasing the brightness of the at least one object O1, O2, O3. By way of example, a so-called "laser light" is suitable as high beam for emitting a directional light beam.

The system is configured to increase the brightness of the at least one object O1, O2, O3 by the at least one actuator A if the at least one second sensor S2 recognizes the at least one object O1, O2, O3 and the at least one first sensor S1 cannot classify the at least one object O1, O2, O3.

In particular, the system is configured to reduce the brightness of the at least one object O1, O2, O3 after the brightness of the at least one object O1, O2, O3 has been increased, for example after a time period of 0.5 s or 1 s has elapsed.

Furthermore, the system is configured to increase the brightness of the at least one object O1, O2, O3 by the at least one actuator A additionally depending on a spatial position of the at least one object O1, O2, O3 and/or of the motor vehicle KFZ.

Figure 2:
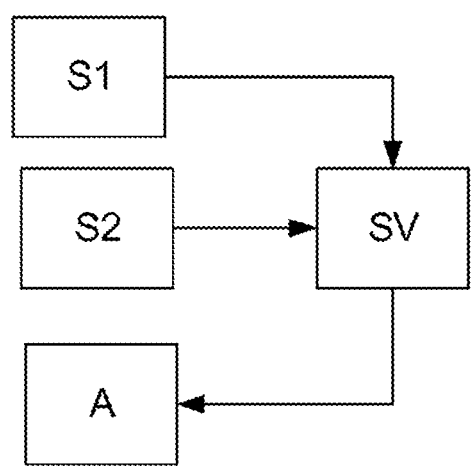
FIG. 2 shows relevant components for the system according to the invention.

FIG. 2 shows relevant components for the system according to the invention. In this case, the system for sensing at least one object O1, O2, O3 in the surroundings of a motor vehicle KFZ comprises at least one first sensor S1 for class allocation of the at least one object O1, O2, O3. Moreover, the system comprises at least one second sensor S2 for recognizing the at least one object O1, O2, O3, and at least one actuator A for increasing the brightness of the at least one object O1, O2, O3.

The system is configured, for example by a control device SV, to increase the brightness of the at least one object O1, O2, O3 by the at least one actuator A if the at least one second sensor S2 recognizes the at least one object O1, O2, O3 and the at least one first sensor S1 cannot classify the at least one object O1, O2, O3.

Figure 3:
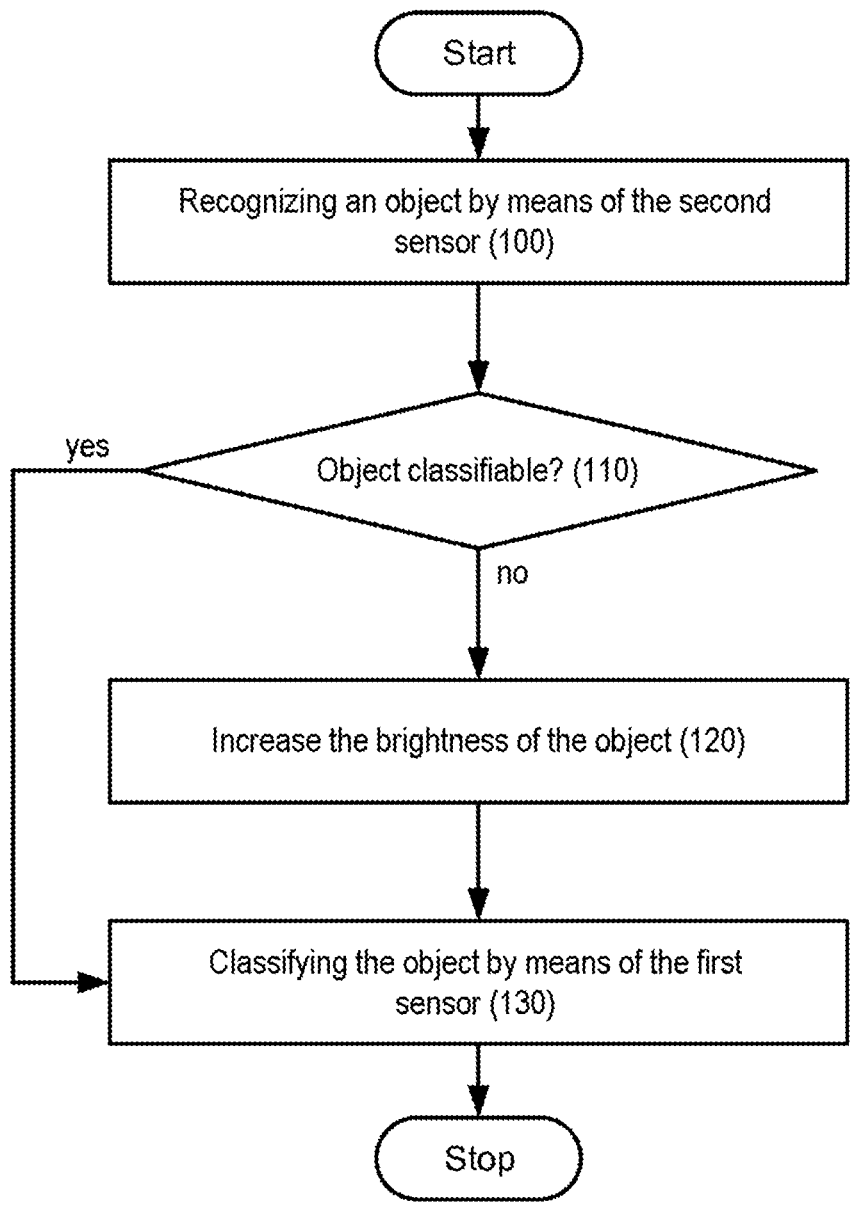
FIG. 3 shows one exemplary embodiment of the method according to the invention.

FIG. 3 shows an exemplary embodiment of the method according to the invention for sensing at least one object O1, O2, O3 in the surroundings of a motor vehicle KFZ.

In this case, the motor vehicle comprises at least one first sensor S1 for class allocation of the at least one object O1, O2, O3, at least one second sensor S2 for recognizing the at least one object O1, O2, O3, and at least one actuator A for increasing the brightness of the at least one object O1, O2, O3.

In this case, one step of the method is recognizing 100 the at least one object O1, O2, O3 by the at least one second sensor S2.

A further step of the method is checking 110 whether the at least one object O1, O2, O3 is classifiable by the at least one first sensor S1, or by the at least one second sensor S2.

If the at least one object O1, O2, O3 is not classifiable, one step of the method is increasing (120) the brightness of the at least one object O1, O2, O3 by the at least one actuator A.

Increasing the brightness of the at least one object O1, O2, O3 is effected in particular by activating a high beam of the motor vehicle KFZ, or by aligning a directional light beam with the at least one object O1, O2, O3 by the at least one actuator A.

Afterward, or alternatively if the at least one object O1, O2, O3 was classifiable even without increasing (120) the brightness, one step of the method is classifying 130 the at least one object O1, O2, O3 by the at least one first sensor S1.

A further step of the method is, in particular, reducing the brightness of the at least one object O1, O2, O3 after the brightness of the at least one object O1, O2, O3 has been increased.

What is claimed is:

1. A system for sensing at least one object in surroundings of a motor vehicle, the system comprising:
at least one first sensor for class allocation of the at least one object, wherein a classification capability of the at least one first sensor depends on a brightness of the at least one object;

at least one second sensor for recognizing a presence of the at least one object; and at least one actuator for increasing the brightness of the at least one object, wherein the system is configured to increase the brightness of the at least one object by the at least one actuator upon determining, based on signals from the at least one first sensor and from the at least one second sensor, that:

the at least one second sensor recognizes the presence of the at least one object without classifying the at least one object, and the at least one first sensor initially cannot classify the at least one object, and wherein the system is configured to use the at least one first sensor to classify the at least one object after the brightness of the at least one object has been increased by the at least one actuator.

2. The system according to claim 1, wherein the system is further configured to reduce the brightness of the at least one object after the brightness of the at least one object has been increased.

3. The system according to claim 1, wherein the at least one first sensor is a camera.

4. The system according to claim 1, wherein the at least one second sensor is at least one of a radar sensor or a lidar sensor.

5. The system according to claim 1, wherein the at least one second sensor is unsuitable for class allocation of the at least one object.

6. The system according to claim 1, wherein the at least one actuator is a high beam of the motor vehicle, and the system is configured to activate the high beam for increasing the brightness of the at least one object.

7. The system according to claim 1, wherein the at least one actuator is configured to emit a directional light beam, and the system is configured to align the light beam with the at least one object by the at least one actuator for increasing the brightness of the at least one object.

8. The system according to claim 1, wherein the system is configured to increase the brightness of the at least one object depending on a spatial position of the at least one object.

9. The system according to claim 1, wherein the system is configured to increase the brightness of the at least one object depending on a spatial position of the motor vehicle.

10. A method for sensing at least one object in surroundings of a motor vehicle, the method comprising:

increasing a brightness of the at least one object by at least one actuator upon determining, based on signals from at least one first sensor and from at least one second sensor, that:

the at least one second sensor recognizes a presence of the at least one object without classifying the least one object, and the at least one first sensor initially cannot classify the at least one object, and using the at least one first sensor to classify the at least one object after the brightness of the at least one object has been increased by the at least one actuator, wherein the motor vehicle comprises:

the at least one first sensor for class allocation of the at least one object, wherein a classification capability of the at least one first sensor depends on the brightness of the at least one object, the at least one second sensor for recognizing the presence of the at least one object, and the at least one actuator for increasing the brightness of the at least one object.

11. The system according to claim 1, wherein the system is further configured to reduce the brightness of the at least one object after a predetermined time duration starting from a time at which the brightness of the at least one object has been increased.

12. The system according to claim 1, wherein the system is further configured to reduce the brightness of the at least one object after the at least one object has been allocated to a class by the at least one first sensor.

13. The system according to claim 1, wherein the system is further configured to increase the brightness of the at least one object depending on a speed of the at least one object.

14. The system according to claim 1, wherein the system is further configured to increase the brightness of the at least one object depending on a differential speed of the at least one object relative to a speed of the motor vehicle.

15. The system according to claim 14, wherein the system is further configured, upon determining that the differential speed is below a threshold value, to increase the brightness of the at least one object with a time delay.

* * * * *